(12) United States Patent
Harayama et al.

(10) Patent No.: US 9,343,731 B2
(45) Date of Patent: May 17, 2016

(54) BATTERY COMPRISING A LIQUID INLET FOR ELECTROLYTE INJECTION

(71) Applicant: TOYOTA JIDOSHA KABUSHIKI KAISHA, Toyota-shi, Aichi (JP)

(72) Inventors: Takashi Harayama, Toyota (JP); Tomohiro Matsuura, Toyota (JP); Kazuyuki Kusama, Nagoya (JP); Satoshi Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/408,835

(22) PCT Filed: Apr. 12, 2013

(86) PCT No.: PCT/JP2013/061015
§ 371 (c)(1),
(2) Date: Dec. 17, 2014

(87) PCT Pub. No.: WO2014/024522
PCT Pub. Date: Feb. 13, 2014

(65) Prior Publication Data
US 2015/0207136 A1    Jul. 23, 2015

(30) Foreign Application Priority Data

Aug. 6, 2012 (JP) ................................. 2012-174353

(51) Int. Cl.
*H01M 2/36* (2006.01)
*H01M 2/30* (2006.01)
(Continued)

(52) U.S. Cl.
CPC .............. *H01M 2/361* (2013.01); *H01M 2/362* (2013.01); *H01M 10/0431* (2013.01); *H01M 2/263* (2013.01)

(58) Field of Classification Search
CPC . H01M 10/0431; H01M 2/361; H01M 2/362; H01M 2/263; H01M 2/36
See application file for complete search history.

(56) References Cited

U.S. PATENT DOCUMENTS

2009/0169993 A1* 7/2009 Ohashi .................... H01G 9/151
429/209
2011/0070471 A1* 3/2011 Cho ......................... H01M 4/13
429/94

(Continued)

FOREIGN PATENT DOCUMENTS

JP    S59-028964 U    2/1984
JP    A-2002-8708    1/2002

(Continued)

OTHER PUBLICATIONS

Nov. 11, 2014 Notice of Allowance issued in Japanese Application No. 2012-174353.

*Primary Examiner* — Kenneth Douyette
(74) *Attorney, Agent, or Firm* — Oliff PLC

(57) ABSTRACT

A battery includes a winding electrode body, a battery case provided with a liquid inlet and positive and negative terminal members. The positive terminal member has a junction part compressed in a direction orthogonal to a winding axis direction. The negative terminal member has a junction part compressed in the direction orthogonal to the winding axis direction. The liquid inlet is positioned leaning to either the positive terminal junction part or the negative terminal junction part. In the winding electrode body, a separation distance from the junction part further away from the liquid inlet to the end lying on the relevant junction side in the winding axis direction is greater than a separation distance from the junction part closer to the liquid inlet to the end on the relevant junction side in the winding axis direction.

2 Claims, 7 Drawing Sheets

(51) Int. Cl.
  *H01M 2/20* (2006.01)
  *H01M 10/04* (2006.01)
  *H01M 2/26* (2006.01)

(56) References Cited

U.S. PATENT DOCUMENTS

2011/0300414 A1* 12/2011 Baek .................. H01M 2/0426
            429/7
2013/0101877 A1    4/2013 Kohno

FOREIGN PATENT DOCUMENTS

| | | |
|---|---|---|
| JP | 2003-346882 A | 12/2003 |
| JP | 2005-251422 A | 9/2005 |
| JP | 2005-285578 A | 10/2005 |
| JP | 2009-037816 A | 2/2009 |
| JP | 2010-176989 A | 8/2010 |
| JP | 2012-004079 A | 1/2012 |
| JP | 2012-195085 A | 10/2012 |
| WO | WO-2011/161984 A1 * 12/2011 .............. H01M 2/26 |

\* cited by examiner

BATTERY COMPRISING A LIQUID INLET FOR ELECTROLYTE INJECTION

CROSS-REFERENCE TO RELATED APPLICATIONS

This is a US national phase application based on the PCT International Patent Application No. PCT/JP2013/061015 filed on Apr. 12, 2013, and claiming the priority of Japanese Patent Application No. 2012-174353, filed on Aug. 6, 2012, the entire contents of which are herewith incorporated by reference.

TECHNICAL FIELD

The present invention relates to a battery and more particularly to a structure of a battery with good impregnation property of electrolyte solution.

BACKGROUND ART

In recent years, batteries such as lithium ion secondary batteries are utilized in various fields, e.g., electronic devices such as a cell phone and a personal computer, and vehicles such as a hybrid vehicle and an electric vehicle. The lithium ion secondary battery particularly is high in energy density and therefore suitable to be mounted in various devices.

One example of the structure of the above secondary batteries is known as one disclosed in Patent Document 1 listed below. The secondary battery disclosed in Patent Document 1 is configured such that a wound electrode body (a flat wound electrode body 4) is housed in a rectangular battery case (a case 3; names and reference signs in Patent Document 1 are parenthesized in the following explanation). The wound electrode body includes a positive electrode sheet (a positive electrode sheet 41) formed of a foil-shaped positive current collecting part (a positive current collecting part 413) having positive active material layers (positive active material layers 412) on surfaces, a negative electrode sheet (a negative electrode sheet 42) formed of a foil-shaped negative current collecting part (a negative current collecting part 423) having negative active material layers (negative active material layers 422) on surfaces, and separators (separators 43) insulating the positive electrode sheet and the negative electrode sheet, which are wound together into a flattened shape. This wound electrode body has a wound positive end part (a protruding end part 411) formed of a positive active material layer unformed portion (an edge portion 414) formed with no positive active material layer, the positive end part being located on one end side in a winding axis direction and also has a wound negative end part (a protruding end part 421) formed of a negative active material layer unformed portion (an edge portion 424) formed with no negative active material layer, the negative end part being located on the other end side in the winding axis direction.

The positive end part is joined with a positive terminal member (a positive terminal 1) and the negative end part is joined with a negative terminal member (a negative terminal 2). A junction part with the positive terminal or the negative terminal in each end part (each protruding end portion 411, 421) is formed of the laminated positive active material layer unformed portion (the edge portion 414) or the laminated negative active material layer formed unformed portion (the edge portion 424) compressed in a thickness direction of a battery case perpendicular to the winding axis direction (see FIG. 1 and [0040] of Patent Document 1). In the secondary battery disclosed in this document, particularly, a part of each end part (each protruding end portion 411, 421) is completely crushed (compressed) in the thickness direction of the battery case when viewed from an end face thereof in the winding axis direction.

The above configured secondary battery provides a difference in thickness between both end parts (the protruding end portions 411, 421) in the winding axis direction of the wound electrode body and a middle portion present between the end parts. Accordingly, the space generated by this thickness difference can receive the positive terminal member and the negative terminal member. This achieves size reduction of the entire battery (see [0018] of Patent Document 1).

RELATED ART DOCUMENTS

Patent Documents

Patent Document 1: JP-A-2002-8708

SUMMARY OF INVENTION

Problems to be Solved by the Invention

However, in the secondary battery disclosed in Patent Document 1 listed above, the positive terminal member and the negative terminal member are joined to the wound electrode body in positions located inside by almost the same distance in the winding axis direction from respective corresponding end parts (the protruding end portions 411, 421) of the wound electrode body. Furthermore, part of each of the end parts (the protruding end portions 411, 421) of the wound electrode body is completely crushed (compressed) in the thickness direction of the battery case when viewed from each end face in the winding axis direction. In other words, at the each end of the wound electrode body in the winding axis direction, the positive electrode sheet or the negative electrode sheet is partially laminated or stacked tightly and this laminated portion is very high in winding density. Thus, both end parts of the wound electrode body in the winding axis direction are low in impregnation of electrolyte solution.

In particular, in a secondary battery, the electrolyte solution is injected in a battery case through a liquid inlet provided therein. If the position of this liquid inlet is decentered toward either end part (the positive end part or the negative end part), there is a possibility that the electrolyte solution could not sufficiently be distributed to the end part located further away from the liquid inlet. In this case, if the winding density of the end part further away from the liquid inlet is high, this may cause a problem with insufficient impregnation of electrolyte solution in the relevant end part. If the electrolyte solution is not sufficiently impregnated, the battery function could not be fulfilled.

The present invention has been made to solve the above problems and has a purpose to provide a battery in which electrolyte solution injected therein through a liquid inlet is sufficiently impregnated in both end parts of a wound electrode body even when the liquid inlet is located in a decentered position close to a positive end part or a negative end part of the wound electrode body.

Means of Solving the Problems

To achieve the above purpose, one aspect of the invention provides a battery comprising: a wound electrode body including a positive electrode sheet that includes a foil-shaped positive current collecting part having surfaces formed with positive active material layers, a negative electrode sheet that includes a foil-shaped negative current collecting part having surfaces formed with negative active material layers, and separators insulating the positive electrode sheet and the negative electrode sheet, the positive electrode sheet and the negative electrode sheet and the separators being wound together, a battery case housing the wound electrode body; a liquid inlet provided in the battery case and used to inject electrolyte solution in the battery case therethrough; and a positive terminal member and a negative terminal member each joined to the wound electrode body. The wound electrode body has a positive end part on one end side in a winding axis direction, the positive end part being formed of a positive active material layer unformed portion of the positive electrode sheet, the positive active material layer unformed portion being unformed with the positive active material layers and wound in a protruding state from the negative electrode sheet and a negative end part on the other end side in the winding axis direction, the negative end part being formed of a negative active material layer unformed portion of the negative electrode sheet, the negative active material layer unformed portion being unformed with the negative active material layers and wound in a protruding state from the positive electrode sheet. The positive end part includes a positive terminal junction part compressed in a direction perpendicular to the winding axis direction and joined with the positive terminal member. The negative end part includes a negative terminal junction part compressed in the direction perpendicular to the winding axis direction and joined with the negative terminal member. The liquid inlet is located in a position leaning to either one of the positive terminal junction part and the negative terminal junction part. The wound electrode body is configured such that a separation distance from the junction part further away from the liquid inlet to an end on the junction part side in the winding axis direction is greater than a separation distance from the junction part closer to the liquid inlet to an end on the junction part side in the winding axis direction.

In the above configured battery, the junction part further away from the liquid inlet is located at a greater distance to the edge of the end part provided with the junction part in the winding axis direction than the junction part closer to the liquid inlet. Thus, the wound electrode body has a lower winding density in the end face on the junction part side further away from the liquid inlet than a winding density in the end face on the junction part side closer to the liquid inlet. This is because the degree of compression of the end face of the wound electrode body varies with the distance of the junction part formed of a compressed portion of the wound electrode body from the end of the wound electrode body.

According to the above configured battery, therefore, even if the liquid inlet is located leaning to either the positive terminal junction part or the negative terminal junction part and thus the electrolyte solution is not sufficiently distributed to the end part (the positive end part or the negative end part) having the junction part further away from the liquid inlet, the end part formed with the junction part further away from the liquid inlet having a low winding density enables increasing the impregnation property of the end part, thereby allowing sufficient impregnation of electrolyte solution to the end part. It is to be noted that the end part formed with the junction part closer to the liquid inlet is allowed to be sufficiently impregnated with the electrolyte solution owing to the short distance to the liquid inlet even through the winding density is high. The above configuration can provide a battery with the wound electrode body sufficiently impregnated with the electrolyte solution in the both end parts.

In the battery configured as above, preferably, the liquid inlet is provided in a position leaning to the positive terminal junction part, the wound electrode body is configured such that a separation distance from the negative terminal junction part to an end on the negative terminal junction part side in the winding axis direction is greater than a separation distance from the positive terminal junction part to an end on the positive terminal junction part side in the winding axis direction.

This configuration allows sufficient impregnation of electrolyte solution to the negative end part formed with the negative terminal junction part even when the liquid inlet is provided closer to the positive terminal junction part and thus can provide a battery with good impregnation of electrolyte solution.

When the battery is charged at a voltage exceeding a specified value in use, the electrolyte solution may vaporize and resultant gas may fill the inside of the battery. This gas is generated mainly on the positive end part side. In the above configuration, the junction part in the positive end part is closer in position to the end in the winding axis direction than that in the negative end part. Accordingly, a portion of the wound electrode body closer to the center in the winding axis direction than the positive terminal junction part can be ensured as a wider expandable region for gas venting (an uncompressed region with no junction part). Thus, a battery can be achieved with good gas venting property.

Effects of the Invention

According to the present configuration, it is possible to provide a battery in which electrolyte solution injected through a liquid inlet is sufficiently impregnated in both end parts of a wound electrode body even when the liquid inlet is located leaning to either a positive end part or a negative end part of the wound electrode body.

MODE FOR CARRYING OUT THE INVENTION

Figure 1:
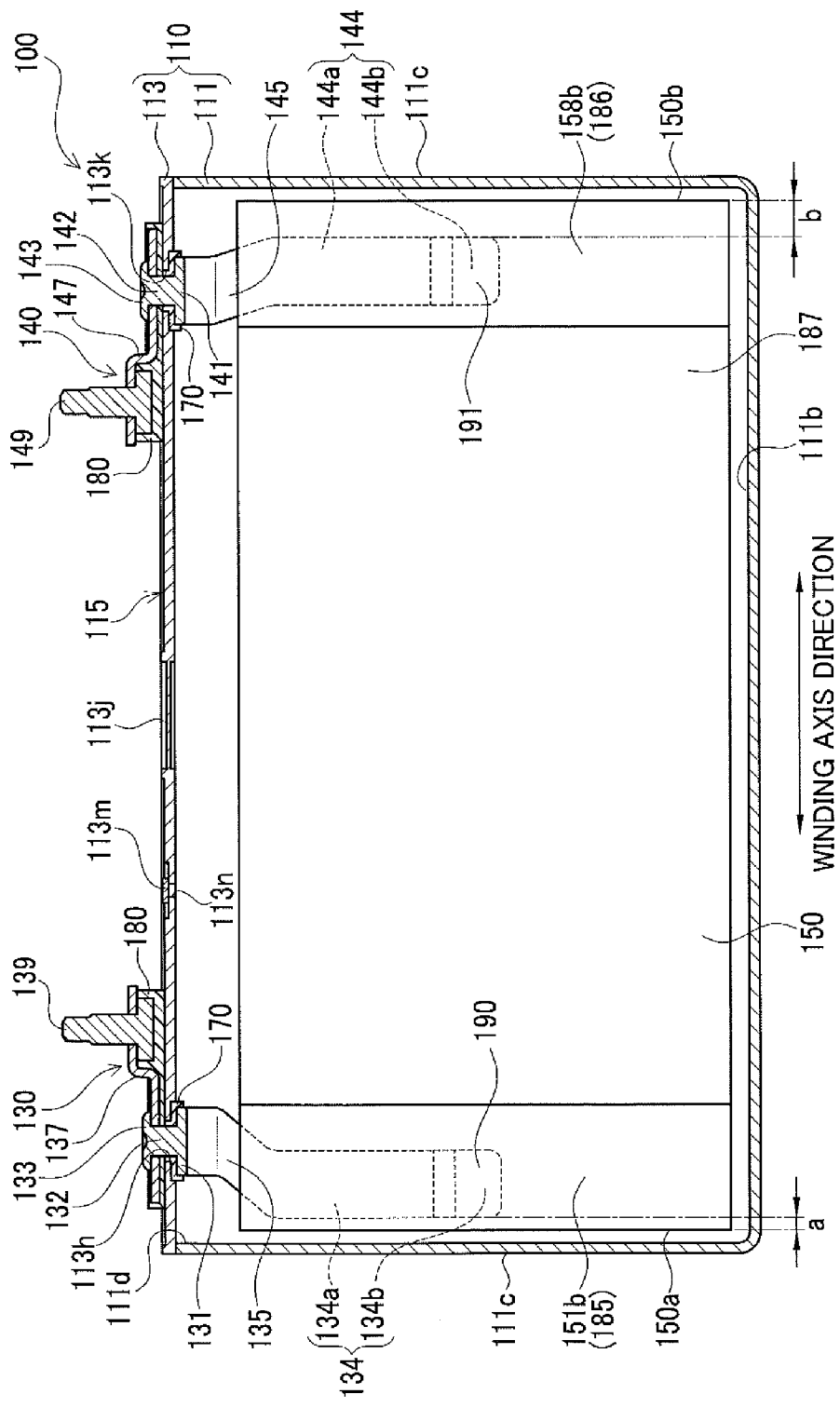
FIG. 1 is a sectional view showing a battery in an embodiment.

A detailed description of a preferred embodiment of a battery embodying the present invention will now be given referring to the accompanying drawings. FIG. 1 is a sectional view of a battery 100 in the embodiment. The battery 100 in this embodiment is a rectangular lithium ion secondary battery including a rectangular battery case 110 and a wound electrode body (a power generating element) 150 housed in the battery case 110 as shown in FIG. 1. The battery 100 will be mounted in a vehicle such as a hybrid vehicle and an electric vehicle or a battery using device such as a hammer drill. In the present description, unless otherwise noted, upper, lower, right, and left sides are defined with reference to FIG. 1 and a short side on a drawing sheet of FIG. 1 is defined as a front side and a far side on the drawing sheet is defined as a rear side.

1. Wound Electrode Body

Figure 2:
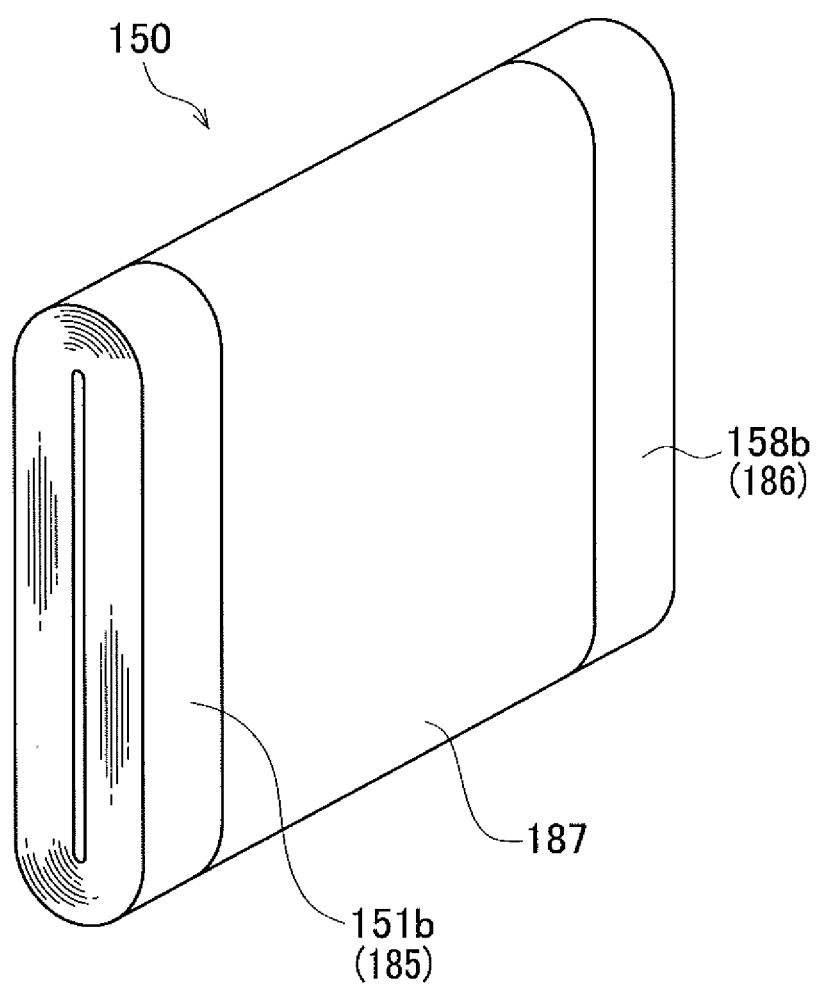
FIG. 2 is a perspective view of a wound electrode body of the battery in the embodiment.
Figure 3:
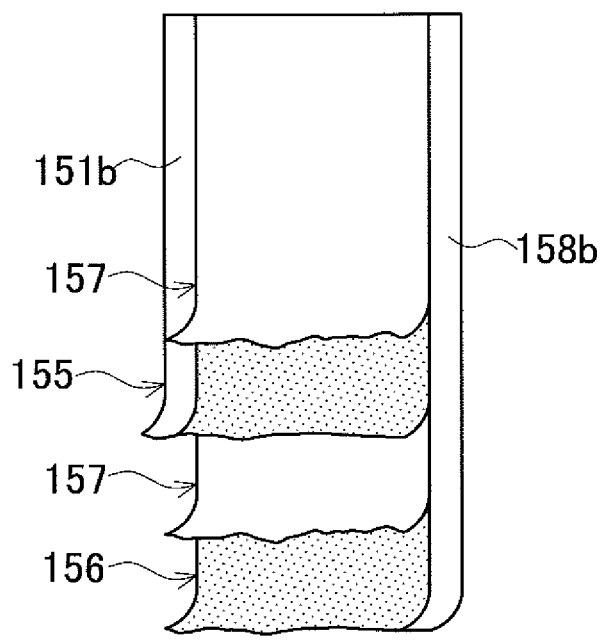
FIG. 3 is a view showing a structure of the wound electrode body.
Figure 4:
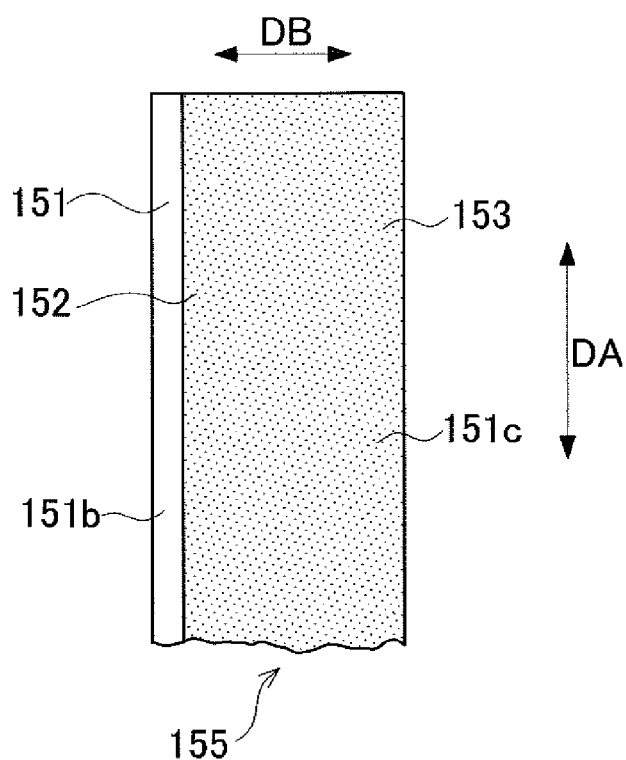
FIG. 4 is a view showing a positive electrode sheet forming the wound electrode body.
Figure 5:
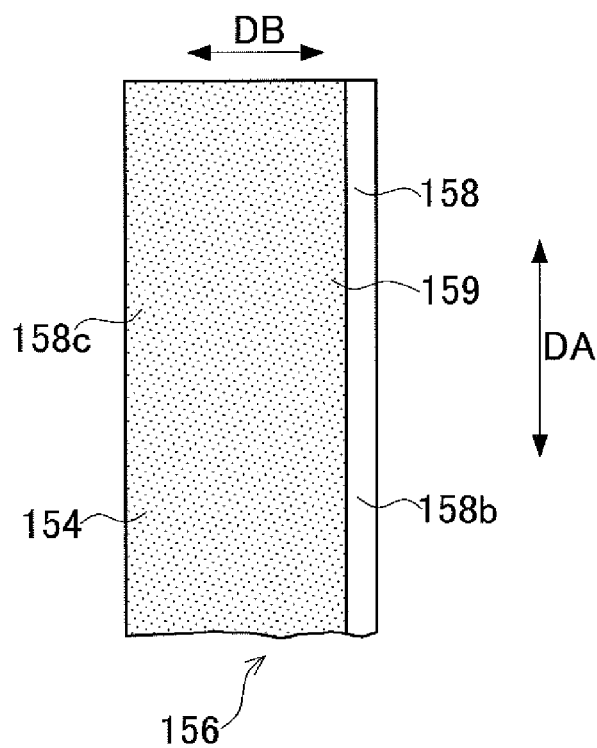
FIG. 5 is a view showing a negative electrode sheet forming the wound electrode body.

The wound electrode body 150 will be explained referring to FIGS. 2 to 5. As shown in FIGS. 2 and 3, the wound electrode body 150 is a flat wound electrode body 150 including a strip-shape positive electrode sheet 155, a strip-shaped negative electrode sheet 156, and separators 157, which are wound together in a flattened shape.

The positive electrode sheet 155 includes a positive current collecting part (a positive base material) 151 made of an aluminum foil extending in a strip shape in a longitudinal direction DA and a positive active material layer (a positive mixture layer) 152 placed on part of each surface of this positive current collecting part 151. The positive active material layer 152 contains a positive active material 153, conductive material made of acetylene black, and PVDF (binder).

Of the positive current collecting part 151, a portion coated with the positive active material layer 152 is referred to as a positive active material layer formed portion (a positive mixture layer coated portion) 151c. On the other hand, a portion uncoated with the positive active material layer 152 is referred to as a positive active material layer unformed portion (a positive mixture layer uncoated portion) 151b. The positive active material layer unformed portion 151b is located in an end part (a left end part in FIG. 4) in a width direction DB (a right and left direction in FIG. 4) of the positive current collecting part 151 (the positive electrode sheet 155) and extends in a strip shape in the longitudinal direction DA (in an up and down direction in FIG. 4) of the positive active material layer 151 (the positive electrode sheet 155).

Furthermore, the negative electrode sheet 156 includes a negative current collecting part (a negative base material) 158 made of a copper foil extending in a strip shape in the longitudinal direction DA and a negative active material layer (a negative mixture layer) 159 located on part of each surface of the negative current collecting part 158. The negative active material layer 159 contains a negative active material 154, SBR (binder), and CMC (thickener).

Of the negative current collecting part 158, a portion coated with the negative active material layer 159 is referred to as a negative active material layer formed portion (a negative mixture layer coated portion) 158c. On the other hand, of the negative current collecting part 158, a portion uncoated with the negative active material layer 159 is referred to as a negative active material layer unformed portion (a negative mixture layer uncoated portion) 158b. The negative active material layer unformed portion 158b is located in an end part (a right end part in FIG. 5) in a width direction DB (a right and left direction in FIG. 5) of a negative current collecting part 158 (the negative electrode sheet 156) and extends in a strip shape in the longitudinal direction DA (in an up and down direction in FIG. 5) of the negative current collecting part 158 (the negative electrode sheet 156).

The positive electrode sheet 155 and the negative electrode sheet 156 configured as above are wound together by interposing the separators 157 one each between them as shown in FIG. 3 into a flattened shape. This assembly is the wound electrode body 150 shown in FIG. 2. The wound electrode body 150 oriented sideways with its winding axis direction coinciding with a horizontal direction is put in the battery case 110 as shown in FIG. 1.

This wound electrode body 150 includes a positive end part 185 formed of the positive active material layer unformed portion 151b wound in a protruding state from the negative electrode sheet 156 as shown in FIG. 2. The positive end part 185 is one end part (a left end part) of the wound electrode body 150 in the winding axis direction.

The wound electrode body 150 further includes a negative end part 186 formed of the negative active material layer unformed portion 158b wound in a protruding state from the positive electrode sheet 155 as shown in FIG. 2. The negative end part 186 is the other end part (a right end part) of the wound electrode body 150 in the winding axis direction.

Further, the wound electrode body 150 includes a power generating part 187 made up of the positive active material layer formed portion 151c (a portion of the positive electrode sheet 155 formed with the positive active material layers 152), the negative active material layer formed portion 158c (a portion of the negative electrode sheet 156 formed with the negative active material layers 159), and the separators 157, which are wound together (see FIG. 2). The power generating part 187 is located between the positive end part 185 and the negative end part 186 in the winding axis direction.

2. Battery Case

Figure 6:
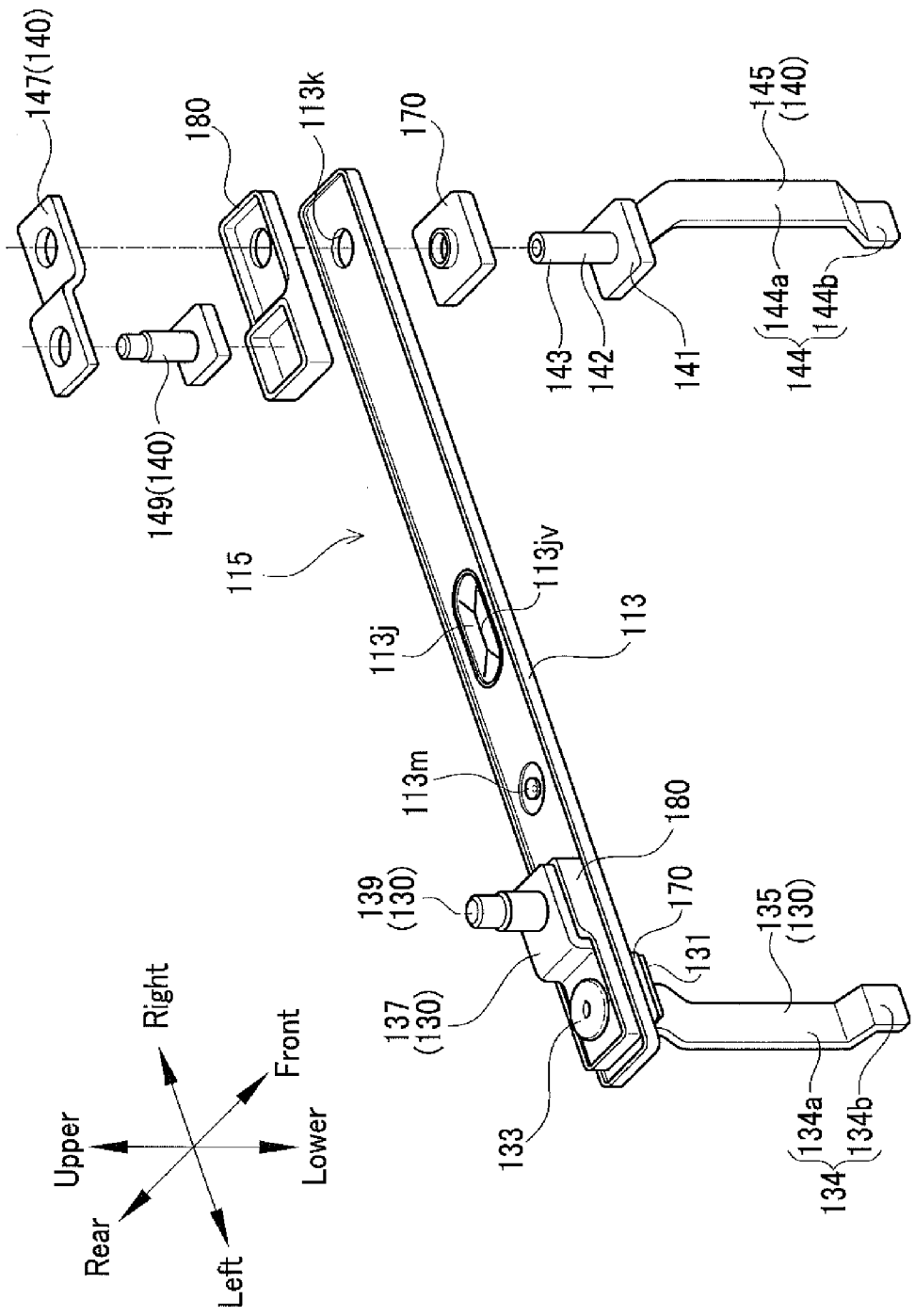
FIG. 6 is a perspective view showing a terminal-attached lid member in the embodiment.

The battery case 110 will be explained referring to FIGS. 1 and 6. FIG. 6 is an exploded perspective view of a part of a terminal-attached lid member 115 in the embodiment.

The battery case 110 includes a rectangular box-shaped case body 111 having an opening 111d on an upper side and a plate-like case lid 113 closing the opening 111d of the case body 111. The battery case 110 is made of metal (concretely, pure aluminum). The battery case 110 is of a flat rectangular shape, in which two of faces excepting the case lid 113 are flat surfaces having a larger area than the others.

The case body 111 internally encloses the wound electrode body 150. The case body 111 includes a rectangular plate-like bottom wall 111b opposed to the case lid 113 and four side walls 111c each standing up from the peripheral edge of the bottom wall 111b.

The case lid 113 is joined to the case body 111 by welding. The case lid 113 has a rectangular plate-like shape and is formed, at both end regions in its longitudinal direction (a right and left direction), with circular through holes 113h and 113k penetrating through the case lid 113. The case lid 113 is further provided, at its center in the longitudinal direction, with a safety valve 113j. This safety valve 113j is formed integral with the case lid 113 to constitute a part of the case lid 113.

The safety valve 113j is formed to be thinner than other portions of the case lid 113 and also is formed, on its upper surface, with a groove 113jv (see FIG. 6). Accordingly, the safety valve 113j operates when the internal pressure of the battery case 110 reaches a predetermined pressure. Specifically, the groove 113jv ruptures when the internal pressure reaches the predetermined pressure, thereby allowing gas in the battery case 110 to release out.

The case lid 113 is formed, between the safety valve 113j and the through hole 113h, with a liquid inlet 113n (see FIG. 1) through which electrolyte solution (not shown) is injected into the battery case 110. This liquid inlet 113n is sealed with an inlet plug 113m.

The battery 100 further includes electrode terminal members (a positive terminal member 130 and a negative terminal member 140) each of which is connected to the electrode body 150 inside the case body 111 and extends out through their corresponding through holes 113*h* and 113*k* of the case lid 113.

The positive terminal member 130 consists of a positive connecting member 135, a positive external terminal member (an outer connecting terminal) 137, and a positive fastening member (a bolt) 139 (see FIGS. 1 and 6). The connecting member 135 is made of metal (pure aluminum), and is connected to the electrode body 150 and extends out through the through hole 113*h* of the case lid 113. The external terminal member 137 is made of metal, and is located on the case lid 113, that is, outside the battery case 110, and is electrically connected to the connecting member 135 outside the battery case 110. The fastening member 139 is made of metal, and is located on the case lid 113, that is, outside the battery case 110, and is electrically connected to the external terminal member 137.

The negative terminal member 140 consists of a negative connecting member 145, a negative external terminal member (an outer connecting terminal) 147, and a negative fastening member (a bolt) 149 (see FIGS. 1 and 6). The connecting member 145 is made of metal (pure copper) and is connected to the electrode body 150 and also extends out through the through hole 113*k* of the case lid 113. The external terminal member 147 is made of metal and is located on the case lid 113, that is, outside the battery case 110, and is electrically connected to the connecting member 145 outside the battery case 110. The fastening member 149 is made of metal and is located on the case lid 113, that is, outside the battery case 110, and is electrically connected to the external terminal member 147.

The battery 100 further includes a gasket (a first insulating member) 170 interposed between the positive terminal member 130 (i.e., the positive connecting member 135) and the case lid 113 to electrically insulate them from each other. The gasket 170 is made of electrically insulating resin (concretely, PFA). Another first insulating member 170 is also interposed between the negative terminal member 140 (i.e., the negative connecting member 145) and the case lid 113.

The battery 100 further includes an insulator (a second insulating member) 180 made of electrically insulating resin (concretely, 100% PPS) and placed on the case lid 113. This insulator 180 is interposed between the positive terminal member 130 (concretely, the positive external terminal member 137 and the positive fastening member 139) and the case lid 113 to electrically insulate them from each other. Another insulator 180 is also interposed between the negative terminal member 140 (concretely, the negative external terminal member 147 and the negative fastening member 149) and the case lid 113.

In the present embodiment, the terminal-attached lid member 115 consists of the electrode terminal members (the positive terminal member 130 and the negative terminal member 140), the gaskets 170, 170, and the insulators 180, 180, which are mounted on the case lid 113. To be concrete, as shown in FIG. 6, the positive external terminal member 137, the insulator 180, the case lid 113, and the gasket 170 are fixedly clamped between a deformed part 133 and a seat part 131 of the positive terminal member 130, while the negative external terminal member 147, the insulator 180, the case lid 113, and the gasket 170 are fixedly clamped between a deformed part 143 and a seat part 141 of the negative terminal member 140. This assembly integrally constitutes the terminal-attached lid member 115.

3. Joining of Electrode Terminal Member and Wound Electrode Body

The details of joining the electrode terminal members (the positive terminal member 130 and the negative terminal member 140) and the wound electrode body 150 will be explained below. Of the electrode terminal members (the positive terminal member 130 and the negative terminal member 140), the positive connecting member 135 and the negative connecting member 145 are joined to the wound electrode body 150. The positive connecting member 135 includes the seat part 131, an insertion part 132, the deformed part 133, and an electrode-body connecting part 134 (see FIGS. 1 and 6). The seat part 131 has a rectangular plate-like shape and is located inside the case body 111. The insertion part 132 has a columnar shape protruding from an upper surface of the seat part 131 and is inserted in the through hole 113*h* of the case lid 113. The deformed part 133 is a portion continuous with an upper end of the insertion part 132 and is formed by riveting or caulking, that is, deformed to extend in diameter into a circular disk shape, and thus electrically connected to the positive external terminal member 137.

The electrode body connecting part 134 has a plate-like portion 134*a* extending from a lower surface of the seat part 131 toward the bottom wall 111*b* of the case body 111 and a welded portion 134*b* bent inward (forward) from the plate-like portion 134*a* and welded to the electrode body 150. The welded portion 134*b* is welded to the positive end part 185 of the wound electrode body 150. Thus, the positive connecting member 135 and the electrode body 150 are electrically and mechanically connected to each other.

The negative connecting member 145 is configured similarly to the positive connecting member 135. That is, the negative connecting member 145 includes the seat part 141, an insertion part 142, the deformed part 143, and an electrode-body connecting part 144 (see FIGS. 1 and 6). The seat part 141 has a rectangular plate-like shape and is located inside the case body 111. The insertion part 142 has a columnar shape protruding from an upper surface of the seat part 141 and is inserted through the through hole 113*k* of the case lid 113. The deformed part 143 is a portion continuous with an upper end of the insertion part 142 and is formed by riveting or caulking, that is, deformed to extend in diameter into a circular disk shape, and thus electrically connected to the negative external terminal member 147.

The electrode-body connecting part 144 includes a plate-like portion 144*a* extending from a lower surface of the seat part 141 to the bottom wall 111*b* of the case body 111 and a welded portion 144*b* bent inward (rearward) from the plate-like portion 144*a* and welded to the wound electrode body 150. The welded portion 144*b* is welded to the negative end part 186 of the wound electrode body 150. Accordingly, the negative connecting member 145 and the wound electrode body 150 are electrically and mechanically connected to each other. It is to be noted that welding of each of the positive connecting member 135 and the negative connecting member 145 is performed for example by spot welding, ultrasonic welding, or the like.

Figure 7:
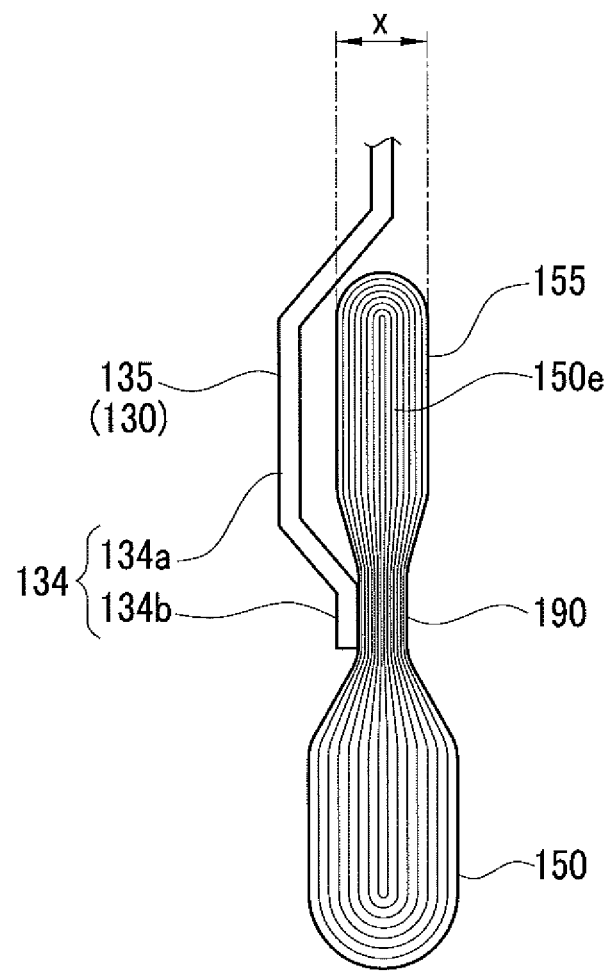
FIG. 7 is a left end view of the wound electrode body to which a positive terminal member is connected.

In this embodiment, a joined portion of the positive end part 185 joined with the positive connecting member 135 is referred to as a positive terminal junction part 190. The positive terminal junction part 190 is compressed in a thickness direction (a front and rear direction) of the battery case 110 perpendicular to the winding axis direction of the wound electrode body 150 as shown in FIG. 7. Further, the positive connecting member 135 is joined in a position at a distance a away from a left end 150*a* of the wound electrode body 150.

Specifically, the separation distance between the positive connecting member 135 and the left end 150a of the wound electrode body 150 in the winding axis direction is defined by a. The position at the distance a from the left end 150a of the wound electrode body 150 is a position hardly distant from the left end 150a of the wound electrode body 150. From this point of view, welding of the positive terminal member 130 with respect to the wound electrode body 150 is referred to as "end welding". In this case of end welding, an upper part of the left end face (a left winding end) 150e consists of the positive electrode sheet 155 wound (laminated) almost without gaps as shown in FIG. 7 when the wound electrode body 150 is viewed from the left end face 150e. Specifically, in the wound electrode body 150, the winding density on the left end 150a side is higher than the winding density on a right end 150b side, which will be mentioned later. This results from the compression of the positive terminal junction part 190, causing surrounding portions thereof to be also compressed.

Figure 8:
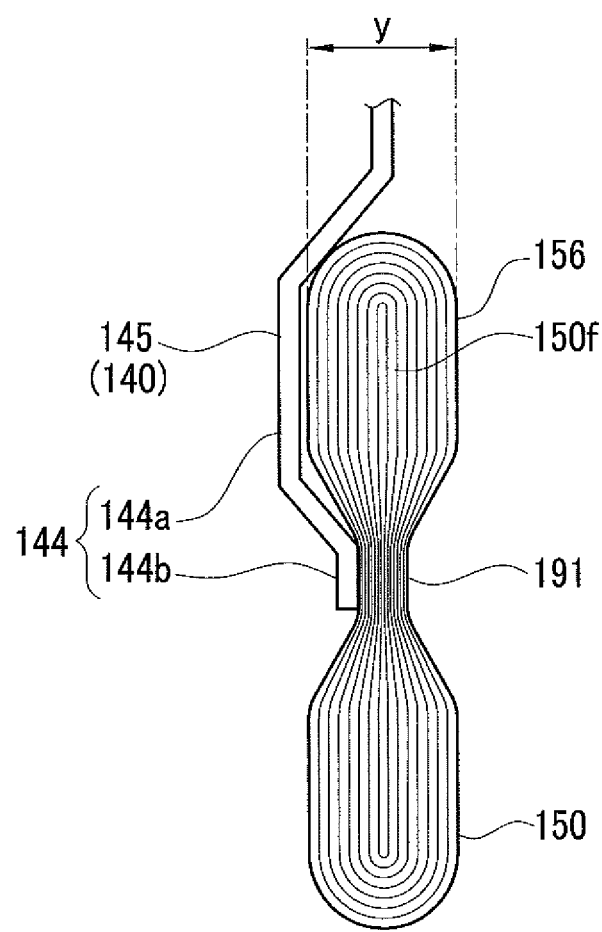
FIG. 8 is a right end view of the wound electrode body to which a negative terminal member is connected.

On the other hand, a joined portion of the negative end part 186 joined with the negative connecting member 145 is referred to as a negative terminal junction part 191. The negative terminal junction part 191 is compressed in the thickness direction (the front and rear direction) of the battery case 110 perpendicular to the winding axis direction of the wound electrode body 150 as shown in FIG. 8. Further, as shown in FIG. 1, the negative connecting member 145 is joined to the wound electrode body 150 in a position at a distance b away from the right end 150b of the wound electrode body 150. Specifically, the separation distance between the negative connecting member 145 and the right end 150b of the wound electrode body 150 in the winding axis direction is defined by b. A relationship between the separation distance b and the separation distance a is a<b. The position at the distance b from the right end 150b of the wound electrode body 150 is a position located inward from the right end 150b of the wound electrode body 150. From this point of view, welding of the negative terminal member 140 with respect to the wound electrode body 150 is referred to as "inside welding". In this case of inside welding, an upper part of the right end face (a right winding end) 150f consists of the negative electrode sheet 156 wound with somewhat gaps as shown in FIG. 8 when the wound electrode body 150 is seen from the right end face 150f. Specifically, a width y (see FIG. 8) of the upper part of the right end face (the right winding end) 150f in the front and rear direction is larger than a width x (see FIG. 7) of the upper part of the left end face (the left winding end) 150e in the front and rear direction. In other words, in the wound electrode body 150, the winding density on the right end 150b side is lower than that on the left end side. This is because the negative terminal junction part 191 is compressed and the right end 150b is away at the distance b from the negative terminal junction part 191, so that the right end 150b is not compressed tightly, or without gaps, differently from the left end face 150e, even when surrounding portions of the terminal junction part 191 are compressed.

In the present embodiment, the position of the liquid inlet 113n provided in the case lid 113 is decentered toward the positive terminal junction part 190 than the center position of the wound electrode body 150 in the winding axis direction (the right and left direction) as shown in FIG. 1. In other words, the positive terminal junction part 190 is closer to the liquid inlet 113n than the negative terminal junction part 191 and the negative terminal junction part 191 is located further away from the liquid inlet 113n than the positive terminal junction part 190.

When the position of the liquid inlet 113n is decentered to the positive end part 185, the electrolyte solution is easily impregnated into the positive end part 185, whereas the electrolyte solution is not easily impregnated into the negative end part 186. In the present embodiment, however, the separation distance b between the negative terminal junction part 191 located in the negative end part 186 further away from the liquid inlet 113n and the right end 150b of the wound electrode body 150 is set greater than the separation distance a between the positive terminal junction part 190 located in the positive end part 185 closer to the liquid inlet 113n and the left end 150a of the wound electrode body 150. Accordingly, the winding density on the right end 150b side of the wound electrode body 150 is lower than the winding density on the left end 150a side, thereby enhancing the impregnation property of electrolyte solution on the right end 150b side (the negative end part 186 side).

In the battery 100 in the present embodiment, even the negative end part 186 further away from the liquid inlet 113n allows sufficient impregnation of the electrolyte solution because the right end face 150f has a low winding density. On the other hand, the positive end part 185 closer to the liquid inlet 113n allows sufficient impregnation of the electrolyte solution even when the left end surface 150e has a high winding density because it is close to the liquid inlet 113n. According to the present embodiment, therefore, a battery 100 with good impregnation of electrolyte solution in the wound electrode body 150 can be produced.

The reason why the liquid inlet 113n is provided in a position leaning to the positive end part 185 in the present embodiment is as below. Specifically, the material of the positive end part 185 is aluminum having lower electric conductivity than copper which is the material of the negative end part 186. Thus, when the positive terminal member 130 is to be welded to the positive end part 185, the welding area thereof is preferably set larger than the welding area of the negative end part 186. However, if the welding area of the positive end part 185 is made larger, the positive end part 185 is compressed (the positive terminal junction part 190 becomes larger) by just that much. This deteriorates the impregnation property of electrolyte solution into the positive end part 185. Therefore, the liquid inlet 113n is placed leaning toward the positive end part 185 to make it easy to distribute the electrolyte solution to the positive end part 185.

4. Injection of Electrolyte Solution

After the terminal-attached lid member 115 is joined to the wound electrode body 150 as mentioned above, the wound electrode body 150 is set in the case body 111, the case lid 113 is placed to close the opening 111d of the case body 111, and then the entire circumference of the case lid 113 is welded to the case body 111. Accordingly, the battery case 110 is sealed while containing the wound electrode body 150 therein.

Thereafter, the electrolyte solution is injected into the battery case 110 through the liquid inlet 113n formed in the case lid 113. The injected electrolyte solution is impregnated into the wound electrode body 150. The electrolyte solution used in the present embodiment is a non-aqueous electrolyte solution prepared by dissolving electrolyte in non-aqueous solvent. As the non-aqueous solvent, one kind or two or more kinds may be selected from ethylene carbonate, propylene carbonate, dimethyl carbonate (DMC), diethyl carbonate, ethyl methyl carbonate (EMC), 1,2-dimethoxyethane, 1,2-diethoxyethane, tetrahydrofuran, 1,3-dioxolan, and others. In the battery 100 in the present embodiment, a mixed solvent of diethyl carbonate and ethylene carbonate (e.g., a mass ratio of 1:1) is used.

As the electrolyte (support salt), one kind or two or more kinds may be selected from various lithium salts including fluorine as a constituent element. For instance, one kind or two or more kinds may be selected from a group including $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, etc. The electrolyte used in the battery 100 in the present embodiment is lithium hexafluorophosphate ($LiPF_6$). The concentration thereof about 1 mol/liter.

After the electrolyte solution is injected through the liquid inlet 113n, the inlet plug 113m is inserted in the liquid inlet 113n. Thus, the liquid inlet 113n is sealingly closed. After subsequent predetermined processings are performed, the battery 100 (see FIG. 1) in the embodiment is completed.

The battery 100 in the present embodiment can be mounted in vehicles that use electrical energy supplied by this battery 100 for part or all of their power sources. The vehicles include, for example, electric vehicles, hybrid vehicles, plug-in hybrid vehicles, hybrid railway vehicles, fork lifts, electric wheelchairs, electric bicycles, electric scooters.

5. Operations and Effects of the Embodiment

The battery 100 in the embodiment as explained above is provided with: the wound electrode body 150 including the positive electrode sheet 155 that includes the foil-shaped positive current collecting part 151 having surfaces formed with the positive active material layers 152, the negative electrode sheet 156 that includes the foil-shaped negative current collecting part 158 having surfaces formed with the negative active material layers 159, and the separators 157 insulating the positive electrode sheet 155 and the negative electrode sheet 156, which are wound together; the battery case 110 enclosing the wound electrode body 150; the liquid inlet 113n provided in the battery case 110 and used to inject the electrolyte solution in the battery case 110 therethrough; and the positive terminal member 130 and the negative terminal member 140 each joined to the wound electrode body 150. The wound electrode body 150 has the positive end part 185 on one end (the left end 150a) side in the winding axis direction, the positive end part 185 being formed of the positive active material layer unformed portion 151b of the positive electrode sheet 155, the positive active material layer unformed portion 151b being unformed with the positive active material layers 152 and wound in a protruding state from the negative electrode sheet 156, and the negative end part 186 on the other end (the right end 150b) side in the winding axis direction, the negative end part 186 being formed of the negative active material layer unformed portion 158b of the negative electrode sheet 156, the negative active material layer unformed portion 158b being unformed with the negative active material layers 158 and wound in a protruding state from the positive electrode sheet 155. The positive end part 185 includes the positive terminal junction part 190 compressed in the direction (the front and rear direction) perpendicular to the winding axis direction and joined with the positive terminal member 130. The negative end part 186 includes the negative terminal junction part 191 compressed in the direction (the front and rear direction) perpendicular to the winding axis direction and joined with the negative terminal member 140.

In the battery 100 in the embodiment, furthermore, the liquid inlet 113n is provided in the position leaning to the positive terminal junction part 190. The wound electrode body 150 is configured such that the separation distance b from the negative terminal junction part 191 to the end (the right end 150b) on the negative terminal junction part 191 side in the winding axis direction is greater than the separation distance a from the positive terminal junction part 190 to the end (the left end 150a) on the positive terminal junction part 190 side in the winding axis direction.

In the battery 100 in the present embodiment configured as above, the negative terminal junction part 191 further away from the liquid inlet 113n is at a greater distance to the end (the right end 150b for the negative terminal junction part 191 and the left end 150a for the positive terminal junction part 190) of the wound electrode body 150 in the winding axis direction (see FIG. 1) than the positive terminal junction part 190 closer to the liquid inlet 113n. In the wound electrode body 150, therefore, the winding density of the end face 150f (see FIG. 8) on the negative terminal junction part 191 side is lower than the winding density of the end face 150e (see FIG. 7) on the positive terminal junction part 190 side. In other words, an interspace between foil parts of the right end face 150f is larger than an interspace between foil parts of the left end face 150e. This is because the degree of compression of each of the end faces 150e and 150f of the wound electrode body 150 is different according to how far the junction parts 190, 191 formed of a compressed portion of the wound electrode body 150 is far away from the ends 150a, 150b of the wound electrode body 150. As the junction part 190 (191) is further away from the end 150a (150b) of the wound electrode body 150, the winding density of the end face 150e (150f) of the wound electrode body 50 is lower. As the junction part 190 (191) is closer to the end 150a (150b) of the wound electrode body 150, the winding density of the end face 150e (150f) of the wound electrode body 150 is higher.

Accordingly, even in the case where the electrolyte solution may not be distributed sufficiently to the negative end part 186 due to the liquid inlet 113n located leaning to the positive terminal junction part 190 as in the embodiment, the negative end part 186 having the low winding density enables enhancing the impregnation property of the negative end part 186, thereby allowing the electrolyte solution to be sufficiently impregnated into the negative end part 186. It is to be noted that the impregnation of electrolyte solution mainly begins with the both ends 150a and 150b of the wound electrode body 150. The positive end part 185 is close to the liquid inlet 113n and thus the electrolyte solution can be sufficiently impregnated into the positive end part 185 even having high winding density. According to the present embodiment, therefore, the battery 100 can be achieved in which the electrolyte solution is sufficiently impregnated into both end parts (the positive end part 185 and the negative end part 186) of the wound electrode body 150.

When the battery 100 is charged at a voltage exceeding a specified value in use, the electrolyte solution may vaporize and resultant gas may fill the inside of the battery 100. This gas is generated mainly on the positive end part 185 side. In the present embodiment, the positive terminal junction part 190 provided in the positive end part 185 is closer to the end of the wound electrode body 150 in the winding axis direction (the left end 150a for the positive terminal junction part 190 and the right end 150b for the negative terminal junction part 191) than the negative terminal junction part 191 provided in the negative end part 186. Thus, a portion of the wound electrode body 150 closer to the center in the winding axis direction than the positive terminal junction part 190 (that is, a portion between the positive terminal junction part 190 and the power generating part 187) can be ensured as a wider extendable region for gas venting (an uncompressed region that does not include the junction part 190). As compared with the case where the separation distance between the positive terminal junction part 190 and the left end 150a of the wound electrode body 150 is set b, not a, the battery can be achieved with good gas venting property.

6. Modified Example

The present invention is explained as above in the embodiment, but is not limited thereto. The invention may be embodied in other specific forms without departing from the essential characteristics thereof. For instance, although the above embodiment shows the lithium ion secondary battery as one example of the battery, the technical concept of the present invention is also applicable to for example any other types of secondary batteries such as a nickel hydride battery and a nickel cadmium battery.

In the present embodiment, the liquid inlet 113n is provided leaning to the positive terminal junction part 190. As an alternative, the liquid inlet 113n may be provided leaning to the negative terminal junction part 191 if it does not take good gas venting property (safety during gas generation) into consideration. In this case, it is configured such that the separation distance a between the positive terminal junction part 190 further away from the liquid inlet 113n and the left end 150a of the wound electrode body 150 is greater than the separation distance b between the negative terminal junction part 191 closer to the liquid inlet 113n and the right end 150b of the wound electrode body 150.

The electrode terminal member (the positive terminal member 130 and the negative terminal member 140) may have any configuration as long as it can output electric power from the wound electrode body 150 to the outside. The electrode terminal member is not necessarily configured of the positive connecting member 135 (the negative connecting member 145), the positive external terminal member 137 (the negative external terminal member 147), and the positive fastening member 139 (the negative fastening member 149) as in the embodiment.

REFERENCE SIGNS LIST

100 Battery
110 Battery case
113n Liquid inlet
130 Positive terminal member
140 Negative terminal member
150 Wound electrode body
185 Positive end part
186 Negative end part
150a Left end
150b Right end
150e Left end face (Left winding end)
150f Right end face (Right winding end)
151 Positive current collecting part
152 Positive active material layer
155 Positive electrode sheet
156 Negative electrode sheet
157 Separator
158 Negative current collecting part
159 Negative active material layer
190 Positive terminal junction part
191 Negative terminal junction part

The invention claimed is:
1. A battery comprising:
a wound electrode body including:
 a positive electrode sheet that includes a foil-shaped positive current collecting part having surfaces formed with positive active material layers;
 a negative electrode sheet that includes a foil-shaped negative current collecting part having surfaces formed with negative active material layers;
 separators insulating the positive electrode sheet and the negative electrode sheet, the positive electrode sheet and the negative electrode sheet and the separators being wound together;
 a positive end part on one end side in a winding axis direction, the positive end part being formed of a positive active material layer unformed portion of the positive electrode sheet, the positive active material layer unformed portion having no coating of the positive active material layers, and being wound in a protruding state from the negative electrode sheet; and
 a negative end part on another end side in the winding axis direction, the negative end part being formed of a negative active material layer unformed portion of the negative electrode sheet, the negative active material layer unformed portion having no coating of the negative active material layers, and being wound in a protruding state from the positive electrode sheet,
a battery case housing the wound electrode body;
a liquid inlet provided in the battery case and used to inject electrolyte solution in the battery case therethrough; and
a positive terminal member and a negative terminal member each joined to the wound electrode body, wherein
 the positive end part includes a positive terminal junction part compressed in a direction perpendicular to the winding axis direction and joined with the positive terminal member;
 the negative end part includes a negative terminal junction part compressed in the direction perpendicular to the winding axis direction and joined with the negative terminal member;
 the liquid inlet is located in a position closer to either one of the positive terminal junction part or the negative terminal junction part; and
 the wound electrode body is configured such that a separation distance between (i) the one of the positive terminal junction part or the negative terminal junction part further away from the liquid inlet and (ii) an end of the wound electrode body on a junction part side further away from the liquid inlet in the winding axis direction is greater than a separation distance between (i) the one of the positive terminal junction part or the negative terminal junction part closer to the liquid inlet, and (ii) an end of the wound electrode body on a junction part side closer to the liquid inlet in the winding axis direction.

2. The battery according to claim 1, wherein:
the liquid inlet is provided in a position closer to the positive terminal junction part; and
the wound electrode body is configured such that a separation distance from between the negative terminal junction part and an end of the wound electrode body on the negative terminal junction part side in the winding axis direction is greater than a separation distance from between the positive terminal junction part and an end of the wound electrode body on the positive terminal junction part side in the winding axis direction.

* * * * *